United States Patent [19]

Butler

[11] 4,425,904

[45] Jan. 17, 1984

[54] TRACKING SYSTEM FOR SOLAR COLLECTORS

[75] Inventor: Barry L. Butler, Golden, Colo.

[73] Assignee: The United States of America as represented by the United States Department of Energy, Washington, D.C.

[21] Appl. No.: 192,799

[22] Filed: Oct. 1, 1980

[51] Int. Cl.³ .............................................. F24J 3/02
[52] U.S. Cl. .................................. 126/424; 126/438; 353/3
[58] Field of Search ............... 126/424, 425, 438, 439; 353/3; 294/88, 106

[56] References Cited

U.S. PATENT DOCUMENTS

| | | | |
|---|---|---|---|
| 1,111,239 | 9/1914 | Smelser | 126/424 |
| 2,600,849 | 6/1952 | Collins et al. | 294/88 |
| 3,924,604 | 12/1975 | Anderson | 126/424 |
| 4,038,972 | 8/1977 | Orrison | 126/425 |
| 4,056,313 | 11/1977 | Arbogast | 353/3 |
| 4,114,594 | 9/1978 | Meyer | 126/424 |
| 4,214,572 | 7/1980 | Gonder | 126/425 |
| 4,245,616 | 1/1981 | Wyland | 126/425 |
| 4,251,135 | 2/1981 | Stone | 350/288 |
| 4,284,063 | 8/1981 | Watson | 126/425 |
| 4,345,582 | 8/1982 | Aharon | 126/424 |

OTHER PUBLICATIONS

W. H. Raser, "Flexed Beams in Central Receiver Heliostat Drives", *AIAA/ASERC Conference on Solar Energy: Technology Status*, Phoenix, Ariz., Nov. 27-29, 1978.

*Primary Examiner*—Lee E. Barrett
*Attorney, Agent, or Firm*—Paul A. Gottlieb; Richard G. Besha

[57] ABSTRACT

A tracking system is provided for pivotally mounted spaced-apart solar collectors. A pair of cables is connected to spaced-apart portions of each collector, and a driver displaces the cables, thereby causing the collectors to pivot about their mounting, so as to assume the desired orientation. The collectors may be of the cylindrical type as well as the flat-plate type. Rigid spar-like linkages may be substituted for the cables. Releasable attachments of the cables to the collectors is also described, as is a fine tuning mechanism for precisely aligning each individual collector.

4 Claims, 17 Drawing Figures

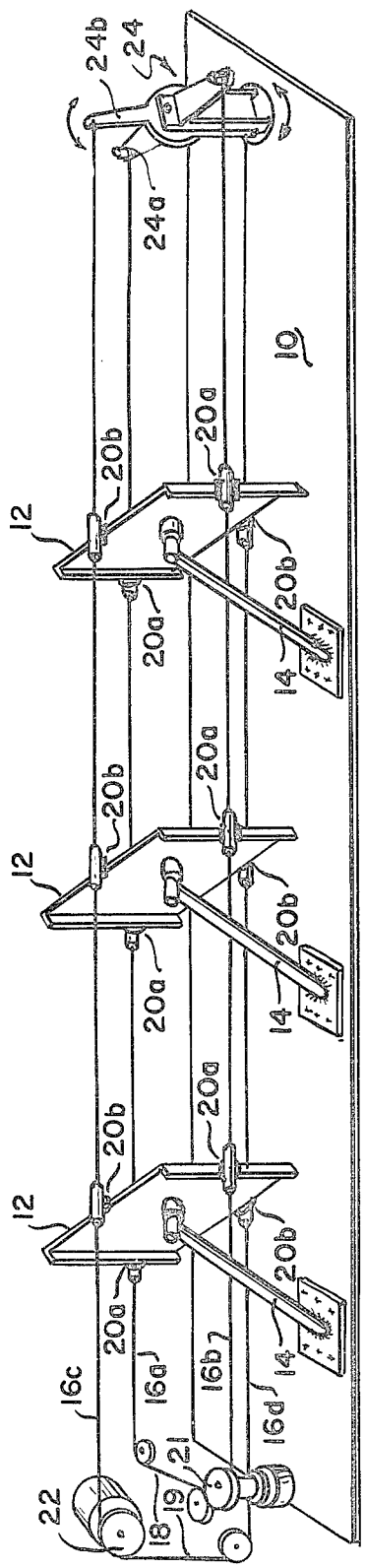
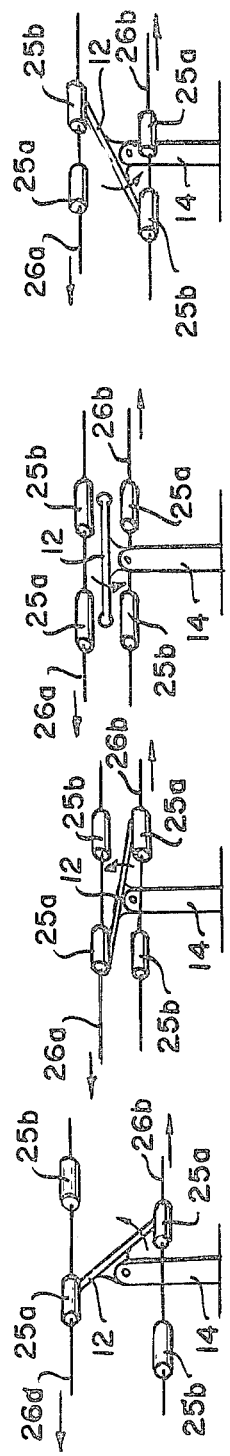
FIG 1
FIG 2a  FIG 2b  FIG 2c  FIG 2d

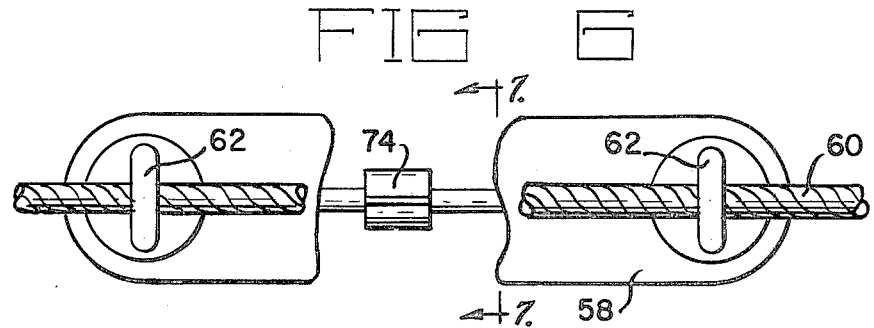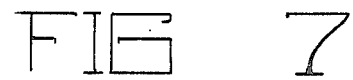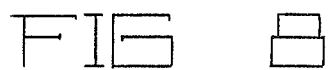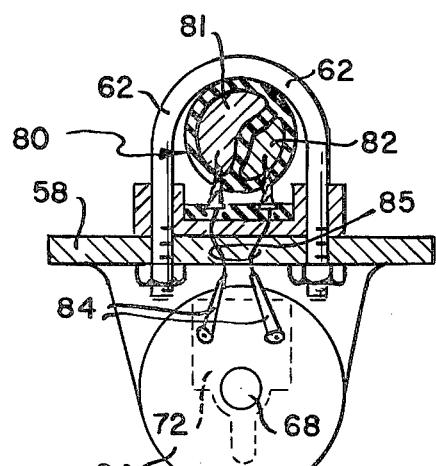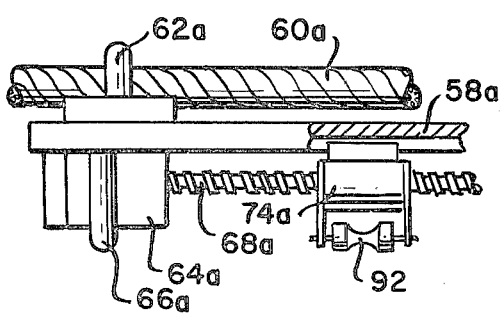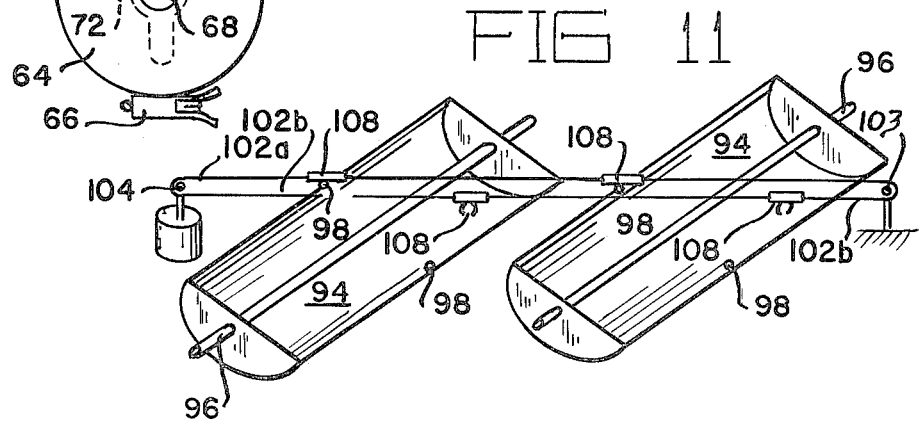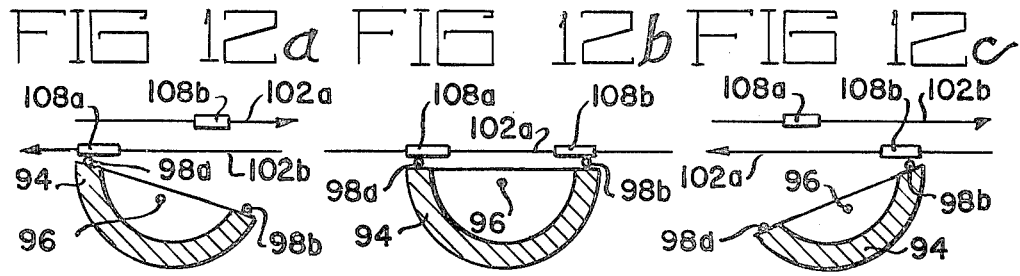

though movable type solar collectors are generally more costly than static solar collectors, they provide increased solar energy collection throughout the daylight hours. One major cost factor of movable collectors is attributed to the mechanical strength which must be imparted to each collector. Prior art tracking systems of the movable type attach to the collectors at a point or along a line. Each collector in a system must be strengthened so as to withstand the massive force concentrations of wind loading and the like at such points or lines. A substantial commercial advantage could, therefore, be obtained if the structural requirements of such movable solar collectors could be lessened.

TRACKING SYSTEM FOR SOLAR COLLECTORS

CONTRACTUAL ORIGIN OF THE INVENTION

The U.S. Government has rights in this invention pursuant to Contract No. EG-77-C-01-4042 between the U.S. Department of Energy and the Midwest Research Institute.

BACKGROUND OF THE INVENTION

This invention pertains to movable solar collectors, and in particular, to tracking systems for such collectors. Al

SUMMARY OF THE INVENTION

It is therefore an object of the present invention to provide an improved tracking system that is accurate and strong enough to withstand wind loading and the like without the structural reinforcement heretofore required.

Another object of the present invention is to provide an improved tracking system for solar collectors that can be built from a minimum number of inexpensive parts.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

A tracking system is provided for a plurality of generally parallel, pivotally mounted, spaced-apart solar collectors arranged in registry. First and second linkages are connected to spaced-apart portions of each solar collector. A driver, connected between the first and second linkages, displaces the linkages so as to position the solar collectors in desired directions. The linkage may include either flexible cables or rigid spar-like members. A second pair of linkages may also be connected to each solar collector, so as to provide orientation in a second direction in response to a second driver.

Releasable attachments connecting the cables to each collector are provided when a wide range of adjustment, i.e. reversal of direction of the collector, is needed. A releasable attachment of a first design is mounted on the cable and includes a pair of pivotally mounted jaws, biased to maintain a closed position, for capturing an eye mounted on the collector. A solenoid opens the jaws to release the eye, and therefore, the collector. A releasable attachment of a second design is mounted on the collector and includes a yoke having a pair of pivotally mounted jaws biased in a closed position. A solenoid mounted to the yoke opens the jaws when a cable is attached or released. A ferrule, mounted on the cable is received by the yoke as it passes through the open jaws. The solenoid is then de-energized, capturing the ferrule, and hence the cable.

A fine tuning mechanism, mounted on the cable, provides precise alignment of the collector, after the linkages are advanced. The mechanism includes a motor-driven screw shaft extending generally parallel to the cable portion to which the mechanism is attached. A follower, attached to the collector and threadingly engaged with the shaft, is advanced as the screw shaft is rotated, providing the fine tuning adjustment desired. The follower may include one of the releasable attachment designs described above. The linkages may be comprised of co-extensive electrical conductor portions which provide electrical power and control commands for the fine tuning mechanism and releasable attachments. The collectors may be of the reflecting flat-plate type, or other configurations, such as cylindrical-type collectors.

DESCRIPTION OF THE DRAWINGS

FIG. 1 is a perspective view of a solar tracking system according to the invention.

FIGS. 2a through 2d are profile views of a continuous adjustment of a flat-plate solar collector.

FIG. 6 shows a plan view of the fine tuning adjustment mechanism of FIG. 5.

FIG. 7 is a cross-sectional view of the fine tuning adjustment mechanism of FIG. 6 taken along lines 7—7.

FIG. 8 is a profile view of an alternative embodiment of a fine tuning adjustment mechanism for use with the releasable attachment of FIG. 4.

FIG. 11 is a perspective view of a solar tracking system for cylindrical collectors.

FIGS. 12a through 12c are profile views of a continuous adjustment of a cylindrical collector.

DETAILED DESCRIPTION OF THE PREFERRED EMBODIMENT

Figure 3:
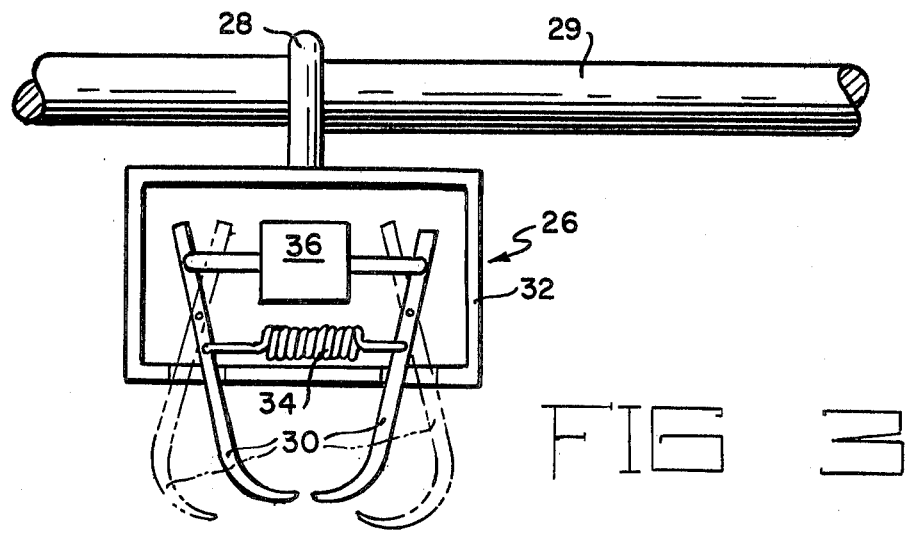
FIG. 3 is a cross-sectional view of a cable-mounted releasable attachment according to the invention.

Referring now to the drawings and especially to FIG. 1, a solar tracking system 10 is shown comprising a plurality of radiant energy receivers or mirrors 12, pivotally mounted on supports 14. Mirrors 12 are interconnected by linkage means or cables 16, secured to the rim of each mirror 12. Cables 16a, 16b connected to mirrors 12 at azimuthal attachmentpoints 20a, form cable control loop 18. Similarly, cables 16c, 16d, connected to mirrors 12 at elevational attachment points 20b, form cable control loop 19. Cable control loops 18, 19 are supported by motor-driven pulleys, 21, 22 respectively, which have tension adjustment means, not shown in FIG. 1. Control loop 18 provides simultaneous azimuthal adjustment of mirrors 12, as pulley 21 is rotated to drive cables 16a, 16b. Similarly, control loop 19 provides simultaneous elevational adjustment of mirrors 12 as pulley 22 rotatably drives cables 16c, 16d. The motor drive systems for pulleys 21, 22 are of the type known in the art to provide precise rotational displacement in response to electrical signals applied to each motor. Thus, pulley 21 can be rotated precise amounts required to provide a predetermined advancement of the cables 16a, 16b, control loop 18, and hence a predetermind amount of azimuthal adjustment for each mirror 12. According to the invention, each mirror 12 is connected to a control loop or pair of control cables 16 for each direction of adjustment. That is, two control loops are provided in the system of FIG. 1, for elevational and azimuthal adjustment, although more or less control loops can be provided, according to the invention.

Cable control loops 19, 20 could comprise continuous cable loops supported throughout their length by a system of pulleys or the like. In the preferred embodiment, however, the ends of each control loop 18, 19 are terminated at a mast 24, which comprises a first pivotally mounted arm 24a for supporting control loop 18 and a second pivotally mounted arm 24b for supporting control loop 19. Thus, arm 24a moves in a horizontal plane, while arm 25b moves in a vertical plane to follow the displacement of control loops 18, 19, respectively, as mirrors 12 are adjusted in azimuthal and elevational directions.

In the system described above, motor-driven pulleys 21, 22 drive cable control loops 18, 19 respectively, and mast arms 24a, 24b act as follower-type supports for the cable control loops. However, the mast-arms 24a, 24b could be driven by motors or the like so as to actuate cable control loops 18, 19. In this latter arrangement, pulleys 21, 22 need not be driven, wherein the motive force required to position mirrors 12 is provided by mast 24. No other modification need be made to the system described above.

The arrangement shown in FIG. 1 provides satisfactory adjustment of mirrors 12, as long as the mirrors are not required to pass through a horizontal elevational position, the direction in which cables 16c, 16d extend. With reference to FIGS. 2a through 2d, mirror 12 is rotated in a counter-clockwise direction, passing through the horizontal position shown in FIG. 2c. Referring now to FIGS. 2a and 2b, cables 26a, 26b secured to mirror 12 by releasable attachments 25a, move mirror 12 in a counter-clockwise direction. In the preferred embodiment, cables 26a, 26b form a control loop, such as control loop 18 of FIG. 1. As shown in FIG. 2c, attachments 25a are released from mirror 12 and, with reference to FIG. 2d, it can be seen that those attachments are replaced by attachments 25b after mirror 12 passes through a horizontal position. Thus, with the aid of releasable attachments 25a, 25b, mirrors 12 can be continuously adjusted between the positions shown in FIGS. 2a, 2d.

One example of a releasable-attachment mechanism, designated by numeral 26, is shown in FIG. 3 comprising a clamp 28, which provides securement to cable 29. Jaws 30 are pivotally mounted to mechanism frame 32, and are biased by spring 34 to assume a closed position. Jaws 30 engage eye attachments or rings mounted on the rim of each mirror 12. When jaws 30 must be opened to release cable 16 from mirror 12, solenoid 36 is energized, drawing jaws 30 apart while overcoming the force of spring 34. To provide the arrangement shown in FIG. 1, eyes must be provided for each mirror 12 at azimuthal attachment points 20a and elevational attachment points 20b, to provide attachment of mirror 12 to the four cables 16 surrounding each mirror.

Figure 4:
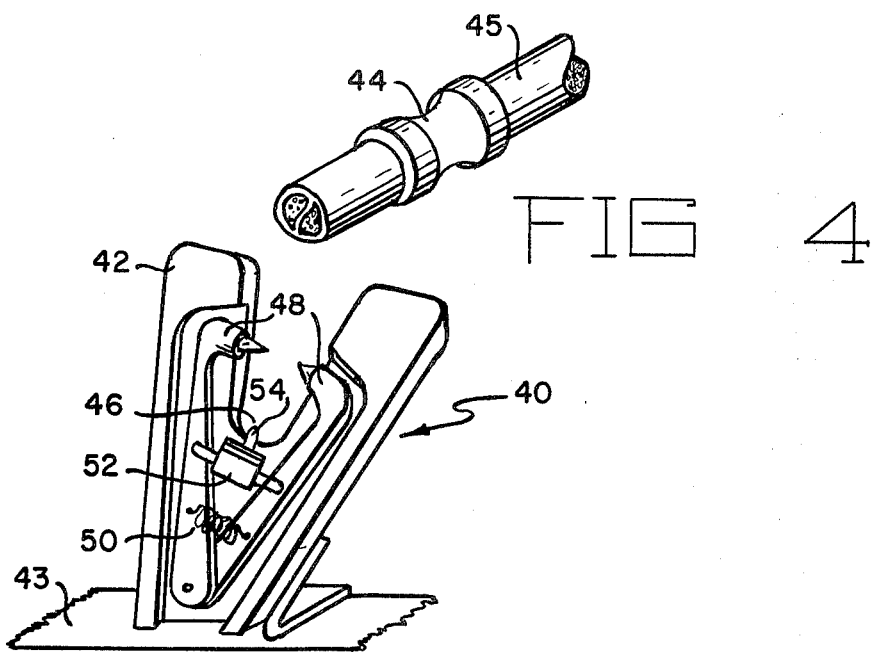
FIG. 4 is a perspective view of a collector-mounted releasable attachment and corresponding cable-mounted ferrule according to the invention.

Referring now to FIG. 4, another example of a releasable attachment mechanism according to the invention, designated by the numeral 40, is shown comprising a yoke 42 mounted on the rim 43 of mirror 12. Ferrule 44 connected to cable 45 is received by yoke 42 for securement in the crotch 46 of yoke 42. Jaws 48, pivotally mounted near the base of yoke 42, are biased by springs 50 to assume a normally closed position. When cable 45 must be released or attached to yoke 42, solenoid 52 is energized to push jaws 48 open, overcoming the force of spring 50. As indicated in FIG. 4, a switch 54 may be installed in the crotch 46 of yoke 42 to de-energize solenoid 52 as ferrule 44 contacts the switch. To provide the arrangement shown in FIG. 1, four mechanisms 40 must be mounted on the rim of each mirror 12 at azimuthal attachment points 20a and elevational attachment points 20b.

Figure 5:
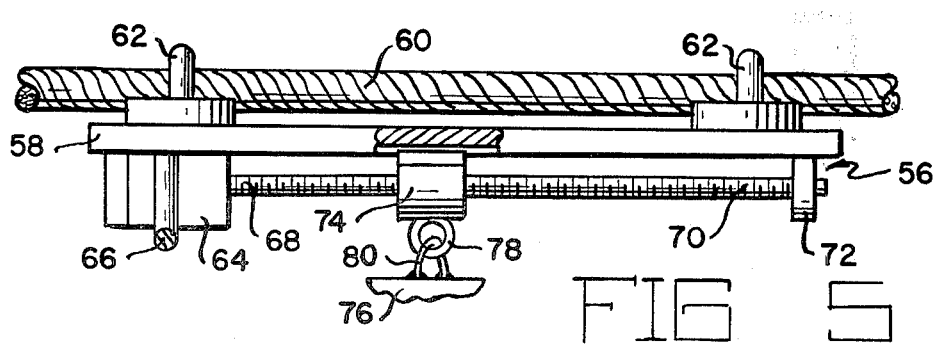
FIG. 5 shows a fine tuning adjustment mechanism, taken in profile.

It is recognized that in some applications, the cables 16 of FIG. 1 are subject to expansion and contraction with temperature changes, such that the resulting adjustment error imparted to mirrors 12 will be intolerable. Further, individual adjustment of each mirror 12 may be desired, as when solar energy is to be delivered to a central receiving tower. Therefore, the fine tuning adjustment mechanism 56 of FIGS. 5 and 6 is employed to provide minute adjustment of each mirror 12 after the cable to which it is secured has been repositioned. Mechanism 56 comprises a support plate 58 attached to cable 60 by two clamps 62. Motor 64, secured to plate 58 by clamp 66 drives screw shaft 68. The free end 70 of screw shaft 68 is rotatably mounted in wall 72. Follower 74, threadingly engaged with shaft 68 is advanced along shaft 68 as that shaft is driven by motor 64. A fixed attachment of follower 74 to mirror 76 is provided by ring 78 which is integrally formed with follower 74. Ring 78 engages ring-like attachment means 79 of mirrors 76. After coarse adjustment of of mirror 76 is provided by advancing cables 60, motor 64 is energized to advanced follower 74 a desired amount to provide fine adjustment of mirror 76. To provide fine tuning adjustment for the arrangement of FIG. 1, four mechanisms 56 must be provided for each mirror 12, at azimuthal adjustment points 20a and elevational attachment points 20b.

FIG. 7 shows one means of providing electrical energization for motor 64 of FIGS. 5, 6. The linkage means 80, which provides interconnection of mirrors according to the invention as set forth above, is comprised of two cable sections 81, 82, each of which includes an inner electrical conductor cable encapsulated in a dielectric material. The electrical contacts 84, secured to support plate 58, penetrate the dielectric encapsulation of cable sections 81, 82 to establish electrical contact with the conductors contained therein. Electrical leads 85 interconnect motor 64 to cable sections 80, 82. Cable sections 81, 82 can be energized at any convenient point along the length of the cables, for example, at mast 24, shown in FIG. 1.

FIG. 8 shows an alternative embodiment of the fine tuning adjustment mechanism 56 of FIG. 5. Mechanism 90 has components similar to mechanism 56 similarly numbered, but with a suffix "a." Mechanism 90 differs from mechanism 56, in that the ring 78 of FIG. 5 is substituted with a ferrule-like member 92, which cooperates with the yoke 42 of FIG. 4 to provide releasable attachment, as well as fine tuning adjustment.

Figure 9:
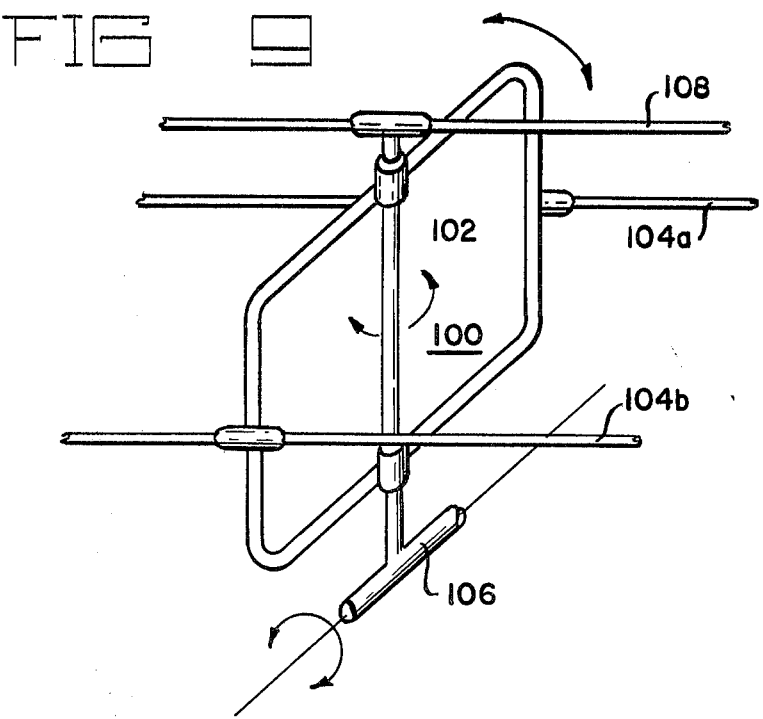
FIG. 9 is a perspective view of an alternative embodiment of a solar tracking system according to the invention.

A simplified embodiment of a tracking system according to the invention is shown in FIG. 9. A reflecting-type flat plate solar collector 100 is pivotally mounted on support riser 102. A cable control loop comprised of cables 104a, 104b provides rotational displacement of collector 100 in azimuthal directions. The mounting of one end of riser 102 to support 106 provides freedom for rotational displacement of collector 100 in elevational directions. Only a single control cable 108 is needed to provide elevational actuation of collector 100. If both sides of collector 100 function to reflect solar energy, the arrangement of FIG. 9 will provide the complete elevational adjustment of FIGS. 1 and 2, without requiring releasable attachments, since collector 100 is free to rotate about riser 102.

Figure 10:
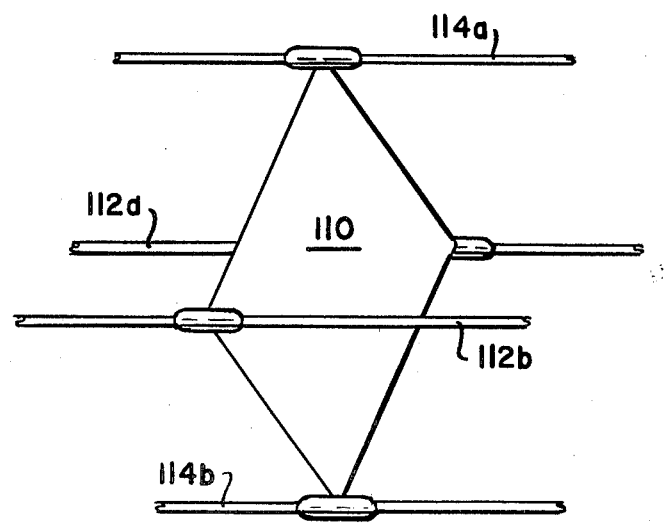
FIG. 10 is a perspective view of another alternative embodiment of a solar tracking system according to the invention.

FIG. 10 shows a tracking arrangement according to the invention which does not require a central pivotal mounting. A reflecting-type flat plate solar collector 110 is suspended by cables 112a, 112b, 114a and 114b. Cables 112a, 112b form a cable control loop for azimuthal adjustment while cables 114a, 114b form a cable control loop for elevational adjustment. Since no central pivotal mounting is provided for collector 110, cables 114a, 114b must withstand any vibrational displacements of cables 112a, 112b which would cause elevational tracking error. Similarly, cables 112a, 112b must be rigid enough to contain displacing forces experienced during the operation of cable 114a, 114b which would cause azimuthal tracking error. While the cables shown in FIG. 10 might be adequate in some applications, they could be replaced by rigid spar-like linkage means if greater strenght is required. The arrangement of FIG. 10 offers a less costly tracking system for use in applications requiring less accurate focusing. The fine tuning adjustment means of FIG. 5, above, can be successfully employed in this tracking system, to offer improved tracking accuracy if necessary.

Referring now to FIGS. 11 and 12, a cylindrical collector tracking system, according to the invention is shown comprising a plurality of cylindrical collectors 94 pivotally mounted to support members 96. Attachment rings 98 are secured to the collectors 94. Cables 102a, 102b form a control loop, receiving support at one end by pulley 103, and being actuated by motor driven pulley 104. Cable attachment means 108 mounted on cables 102a, 102b provide engagement with the attachment rings 98 of collectors 94. The arrangement of attachments 98, 108 may take any suitable form, such as the arrangements of FIGS. 3-8 described above. FIGS. 12a through 12c show a continuous adjustment of one of the collectors 94 of FIG. 9. If the adjustment of collector 94 must extend through the horizontal position of FIG. 12b, then the releasable attachment of FIGS. 3 and 4 must be provided for each collector in the system. FIGS. 12a through 12c, show the rotation of collector 94 in a counter-clockwise direction, in response to the actuation of cables 102a, 102b. As shown in FIG. 12a, attachment ring 98a is engaged by mechanism 108a. Collector 94 is then rotated until the horizontal position of FIG. 10b is assumed, whereupon attachment ring 96b is engaged by mechanism 108b. The direction of the rotation of the control cable loop is then reversed and cable attachment means 108a is released from ring 98a, such that cable attachment 108b will continue the counter-clockwise movement of collector 84, as shown in FIG. 12c.

The tracking systems for solar collectors described above find particular application as heliostats, a devices which tracks the sun throughout the daylight hours, steadily directing radiant energy onto a receiver tower. The tracking system according to the invention is particularly advantageous since it can simultaneously align a plurality of individual solar collectors, so as to direct the energy reflected from those collectors onto a single target. While the tracking system according to the invention is useful for directing energy onto a non-focusing receiver tower, it is particularly useful in conjunction with a focusing type receiver tower in which radiant energy must be focused on a point on the tower's surface. Either type of receiver tower converts the radiant energy into a different form, (usually electrical energy) for transmission to an energy utilization means, (such as a power transmission system of an electric utility).

It will become apparent to those skilled in the art that the cables shown and described above could be replaced by rigid-spar like members to provide the linkage means coupling each mirror to a drive source. Also, while the attachment of linkage means to a mirror has been shown at rim positions of the mirrors, other arrangements are possible. For example, the linkage means could pass through apertures formed in interior portions of a mirror. Attachment to the mirror would be provided at an interior portion of the mirror, rather than at its rim.

The foregoing is considered as illustrative only of the principles of the invention. Further, since numerous modifications and changes will readily occur to those skilled in the art, it is not desired to limit the invention to the exact construction and operations shown and described, and accordingly all suitable modifications and equivalents may be resorted to, falling within the scope of the invention.

The embodiments of this invention in which an exclusive property or privilege is claimed are defined as follows:

1. A solar collector tracking system comprising;
   at least one solar collector;
   pivotal mounting means attached to said solar collector;
   at least two linkage means connected to said collector at spaced-apart portions thereof, said linkage means including elongated electrically insulated electrical conductor portions;
   drive means for displacing said linkage means so as to cause said solar collector to pivot, thereby aligning said solar collector in a predetermined direction;
   fine tuning adjustment means including a frame supported from said linkage means;
   a follower connected to said collector;
   an elongated shaft connected to said frame, said shaft threadingly engaged with said follower;
   an electric motor, connected to said shaft for rotational drive thereof; and
   fine tuning adjustment means including means electrically connecting said conductor portions to said motor.

2. The apparatus of claim 1, wherein said follower includes means for releasably engaging said collector.

3. A solar collector tracking and support system comprising:
   at least one solar collector;
   first and second cables separately connected to said solar collector at spaced-apart portions thereof, said first and said secnd cables and said solar collector connected together to form a first closed loop such that said first and said second cables support forces on said solar collector which extend generally parallel to said first and said second cables;

pivotal mounting means attached to said solar collector so as to support generally vertical forces acting on said solar collector and said firt and said second cables, said solar collector being mounted thereby for pivotal movement in azimuthal and elevational directions;

a first drive means for displacing said first and said second cables so as to cause said solar collector to pivot, said first and said second cables cooperating with said first drive means to provide azimuthal alignment of said solar collector;

third and fourth cables separably connected to said solar collector spaced-apart portions thereof;

a second drive means for displacing said third and said fourth cables so as to cause said solar collector to pivot, thereby providing elevational alignment of said solar collector, said third and said fourth cables and said solar collector connected together to form a second closed loop such that said third and said fourth cables support forces on said solar collector which extend generally parallel to said third and said fourth cables;

separable connection means includes with each of said cables for separable connection to said solar collector; and connection control means for selectively connecting and disconnecting said separable connection means with respect to spaced-apart alternating portions of said solar collector.

4. The apparatus of claim 3 wherein said separable connection means and said connection control means comprise null means for displacing said solar collector through a horizontal null position, and said separable connection means comprises a pair of jaws movable to a closed and an open position, means for biasing said jaws in one of said closed and said open positions, means for selectively overriding said biasing means to maintain said jaws in the other of said closed and said open positions.

* * * * *